Patented Aug. 13, 1940

2,211,338

UNITED STATES PATENT OFFICE 2,211,338

PREPARATION OF ESTERS OF AGAR

Carl J. Malm and John Emerson, Rochester, N. Y., assignors to Eastman Kodak Company, Rochester, N. Y., a corporation of New Jersey No Drawing. Application September 17, 1938, Serial No. 230,595

16 Claims. (Cl. 260—234)

This invention relates to esters of agar prepared by reacting upon the same with a dicarboxylic acid anhydride in the presence of a tertiary organic base.

As agar is not soluble in solvents, there are many uses to which it cannot be put, particularly in photographic materials where it is unsuitable for use due to its tendency to stick to gelatin and its insolubility in solvents or in an alkaline solution.

An object of our invention is to prepare an agar derivative which is soluble in organic solvents and in alkaline solutions. Another object of our invention is to provide a practical method of preparing such derivatives.

We have found that the dicarboxylic acid esters of agar are soluble both in various organic solvents and in an alkaline aqueous solution. We have found that these esters may be prepared by treating the agar with a dicarboxylic acid anhydride in the presence of a tertiary organic base. The resulting esters are soluble in a number of organic solvents and these esters can be employed as a coating or backing for photographic film from which they may be removed by means of alkaline solutions.

The dicarboxylic acid esters of agar may be prepared by first softening or swelling the agar, such as by soaking in water or dilute acid, and then removing the aqueous liquid therefrom and subsequently treating the swollen agar with a mixture of dicarboxylic acid anhydride and a tertiary organic base at an elevated temperature. Both the alkyl dicarboxylic acid anhydrides, such as succinic anhydride or the aryl dicarboxylic acid anhydrides, such as phthalic anhydride, may be employed for esterifying the agar. The anhydrides may be of dicarboxylic acids in which the connecting atoms between the two carboxyl groups are carbons or acids in which the carboxyl groups are linked by heterogeneous linkages, such as the anhydride of diglycolic acid. The reaction should be carried out in the presence of a tertiary organic base, such as pyridine, quinoline, alpha-picoline or dimethylaniline. The agar ester formed dissolves in the bath and, therefore, the usual method of precipitation is to use a dilute aqueous mineral acid which neutralizes the base and assures recovery of an agar ester having free carboxyl groups. A temperature of approximately 90° C. has been found to be quite suitable for preparing the dicarboxylic acid esters of agar. If desired, a lower temperature may be used, however, the esterification requires a somewhat longer time, and therefore, is not as practical as the use of a temperature in the vicinity of 90° or 100° C.

The ester obtained forms salts with the alkalies, such as sodium, potassium or ammonium. For instance, by treating the dicarboxlic acid ester of agar with sodium hydroxide or a sodium carbonate, the resulting sodium salt of the agar ester which is water soluble is formed. If treated with ammonia or its hydroxide, the ammonium salt of the agar ester is formed. Other metal salts may be prepared, preferably by a double decomposition reaction in which the sodium salt reacts with a salt of the metal in aqueous solution. Salts of metals, such as copper, calcium, silver, zinc or any of the other metals may be prepared in this manner. The following example illustrates a suitable method for preparing dicarboxylic acid esters of agar in accordance with our invention.

100 parts of agar was soaked in 1000 parts of distilled water for one-half hour. The agar was then dehydrated with acetone and added to a mixture of 500 parts of pyridine and 400 parts of phthalic anhydride. The mixture was kept at 90° C. for 20 hours. The solution was diluted with 800 parts of 95% acetone and then precipitated in a large amount of distilled water containing 500 parts of 36% hydrochloric acid. The precipitant was washed with distilled water and dried. The resulting product, agar phthalate, had a phthalyl content of 60.3% and was soluble in the following solvents: 95% actone, 95% methyl ethyl ketone, mixtures of acetone and ethyl or methyl alcohol, ethylene chloride-methyl alcohol (4:1), benzene-methanol (1:1), toluene-methanol (1:1) beta methoxy ethyl alcohol, beta ethoxy ethyl alcohol and ethoxy ethyl acetate. The agar phthalate formed salts with ammonium, sodium, or potassium, which salts were soluble in distilled water.

The above example is a typical reaction in accordance with our invention and it may be duplicated using some other dicarboxylic acid anhydride than phthalic, such as succinic anhydride or some other tertiary organic base than pyridine, such as mentioned above. We have found that, if the agar is soaked in water containing some mineral acid, such as hydrochloric acid, a clearer product is obtained than when distilled water is employed. Therefore, in the example, instead of using distilled water, an acid bath may be employed and the agar may be washed free of acid with distilled water before the dehydration with acetone. Other dehydrating agents such as ethyl methyl ketone, 1-4 dioxane or pyridine may be employed.

The esters prepared in accordance with our invention, due to their solubility in various organic solvents, may be employed commercially for various purposes, such as coatings, the making of sheeting or yarn for electrical insulation, for the sheeting to be employed in laminated glass or other laminated products, etc. These esters, however, have been found to be particularly suitable as an antihalation backing on photographic film. Also, the salts may be employed in admixture with gelatin in photographic emulsions. Due to the property of this ester of being dissolved by alkaline solutions, these esters are particularly suitable for backings which it is desirable should be removed during the processing of the film.

Salts of the dicarboxylic acid esters of agar may be prepared by reacting with a substituted ammonia, such as ethylamine or an ethanolamine. Also, as illustrated by the reaction, the product before precipitation with dilute acid is an amine salt of the agar ester. If desired, the agar may first have part of its groups replaced by other acyl constituents, such as acetyl or lower fatty acid groups. For instance, agar may be incompletely acetylated or completely acetylated and then hydrolyzed and the agar acetate may be employed as the starting material instead of agar itself. Instead of an ester of agar an agar ether can be employed as starting material provided it has some free unetherified hydroxyl groups.

We claim:

1. The process of preparing a dicarboxylic acid ester of agar which comprises reacting upon the pretreated agar with an esterification bath comprising a dicarboxylic acid anhydride and a tertiary organic base.

2. The process of preparing a dicarboxylic acid ester of agar which comprises presoaking the agar with aqueous acid, dehydrating the agar and subsequently reacting upon it with an esterification mixture comprising a dicarboxylic acid anhydride and a tertiary organic base.

3. The process of preparing a dicarboxylic acid ester of agar which comprises presoaking the agar with aqueous acid, dehydrating the agar and subsequently reacting upon it with an esterification mixture comprising a dicarboxylic acid anhydride and a tertiary organic base and then removing the agar ester from the reaction mixture by precipitating it in dilute aqueous acid.

4. The process of preparing agar phthalate which comprises soaking agar in distilled water, dehydrating the same with a water-miscible organic solvent and subsequently reacting upon the agar with a dicarboxylic acid anhydride in the presence of a tertiary organic base and removing the agar ester from its reaction mixture by precipitating in dilute mineral acid.

5. A dicarboxylic acid ester of agar.

6. A salt consisting of a dicarboxylic acid ester of agar in which one of the carboxyls of the dicarboxylic acid radical is combined with a base.

7. An alkali metal salt of a dicarboxylic acid ester of agar.

8. An alkali metal salt of agar phthalate.

9. A sodium salt of agar phthalate.

10. A dicarboxylic acid ester of agar acetate.

11. The process of preparing a dicarboxylic acid ester of agar, which comprises reacting upon agar or an agar compound containing free and esterifiable hydroxyl groups with an esterification bath comprising a dicarboxylic acid anhydride and a tertiary organic base.

12. A dicarboxylic acid ester of agar, one of the carboxyls of each dicarboxylic acid radical being unesterified.

13. A phthalate of agar, one of the carboxyls of each phthalyl group being unesterified.

14. The process of preparing a dicarboxylic acid ester of agar which comprises reacting upon an agar compound containing free and esterifiable hydroxyl groups with an esterification bath comprising a dicarboxylic acid anhydride and a tertiary organic base.

15. A salt consisting of a phthalic acid ester of agar in which one of the carboxyls of the dicarboxylic acid radical is combined with a base.

16. A phthalic acid ester of agar acetate.

CARL J. MALM.
JOHN EMERSON.